(12) United States Patent
Lehmann et al.

(10) Patent No.: US 6,601,682 B2
(45) Date of Patent: Aug. 5, 2003

(54) CLUTCH DISC

(75) Inventors: Stefan Lehmann, Ettlingen (DE);
Karl-Ludwig Kimmig, Ottenhöfen (DE); Roland Seebacher, Neuried-Ichenheim (DE); Friedrich Gerhardt, Kehl-Leutesheim (DE); Joachim Hoffman, Wooster, OH (US); Hermann Langeneckert, Appenweier (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 09/837,508

(22) Filed: Apr. 18, 2001

(65) Prior Publication Data

US 2001/0032769 A1 Oct. 25, 2001

(30) Foreign Application Priority Data

Apr. 20, 2000 (DE) .......................................... 100 19 550

(51) Int. Cl.$^7$ ................................................ F16D 23/00
(52) U.S. Cl. ........................ 192/55.1; 192/30 V; 464/68
(58) Field of Search ............................... 192/30 V, 211, 192/208, 213.1–213.22, 55.1, 55.61, 70.17, 214.1; 74/574; 464/66, 68, 30

(56) References Cited

U.S. PATENT DOCUMENTS

| 2,176,696 | A | | 10/1939 | Wemp |
| 3,249,995 | A | | 5/1966 | Smirl |
| 4,416,564 | A | | 11/1983 | Billet et al. |
| 4,613,029 | A | * | 9/1986 | Beccaris .................. 192/210 |
| 4,620,626 | A | * | 11/1986 | Lech et al. ................ 192/213 |
| 4,681,199 | A | * | 7/1987 | Maucher et al. ......... 192/105 B |
| 4,792,030 | A | | 12/1988 | Huber et al. |
| 4,846,323 | A | * | 7/1989 | Fukushima .............. 192/30 V |
| 4,846,328 | A | * | 7/1989 | Fukushima .............. 192/214.1 |
| 5,135,089 | A | * | 8/1992 | Kovac ..................... 192/209 |
| 5,146,811 | A | * | 9/1992 | Jackel ...................... 74/574 |
| 5,217,412 | A | | 6/1993 | Indlekofer et al. |
| 5,273,372 | A | * | 12/1993 | Friedmann et al. ........... 464/24 |
| 5,409,091 | A | | 4/1995 | Reik et al. |
| 5,499,703 | A | * | 3/1996 | Kii et al. .................. 192/30 V |
| 5,725,456 | A | | 3/1998 | Fischer et al. |
| 5,778,738 | A | * | 7/1998 | Takabayashi et al. ..... 192/70.17 |

(List continued on next page.)

FOREIGN PATENT DOCUMENTS

| DE | 29 51 573 | 12/1979 |
| DE | 41 17 582 | 5/1991 |
| DE | 43 04 778 | 2/1993 |
| DE | 43 22 578 | 7/1993 |
| DE | 44 24 186 | 7/1994 |
| DE | 199 01 043 | 1/1999 |
| DE | 199 20 397 | 5/1999 |

OTHER PUBLICATIONS

Duffy, James E., *Modern Automotive Technology*, p. 1050, Goodhart–Willcox Company, Inc., Tinley Park, Illinois 1994.

*Primary Examiner*—Rodney H. Bonck
*Assistant Examiner*—David D. Le
(74) *Attorney, Agent, or Firm*—Darby & Darby

(57) ABSTRACT

A power train between the output shaft of the engine and the input shaft of the transmission in the power train of a motor vehicle has a composite flywheel receiving torque from the output shaft and transmits torque to the input shaft by way of a clutch disc in response to engagement of a friction clutch which is arranged to transmit torque between the clutch disc and the flywheel. The clutch disc has an input section adapted to receive torque from the flywheel and an output section adjacent the mass of a dynamic damper. Transmission of torque between the mass and the clutch disc takes place by way of the coil springs of an oscillation damper and a slip clutch in series with the oscillation damper.

20 Claims, 3 Drawing Sheets

U.S. PATENT DOCUMENTS

| | | | | |
|---|---|---|---|---|
| 5,944,610 A | * | 8/1999 | Sudau | 464/24 |
| 5,967,278 A | * | 10/1999 | Fukushima et al. | 192/30 V |
| 5,979,623 A | * | 11/1999 | Yamamoto | 192/30 V |
| 6,012,559 A | * | 1/2000 | Yamamoto | 192/30 V |
| 6,106,430 A | * | 8/2000 | Peinemann | 192/201 |
| 6,119,839 A | * | 9/2000 | Jackel et al. | 192/205 |
| 6,209,696 B1 | * | 4/2001 | Mokdad et al. | 192/207 |
| 6,241,614 B1 | * | 6/2001 | Mizukami et al. | 192/213.21 |
| 6,299,541 B1 | * | 10/2001 | Bertin et al. | 192/214 |
| RE37,465 E | * | 12/2001 | Reik et al. | 192/113.4 |
| 6,336,867 B1 | * | 1/2002 | Uehara | 464/68 |

* cited by examiner

CLUTCH DISC

CROSS-REFERENCE TO RELATED CASES

The present application claims the priority of commonly owned copending German patent application Serial No. 100 19 550.4 filed Apr. 20, 2000. The disclosure of the above-referenced German patent application, as well as that of each US and foreign patent and patent application identified in the specification of the present application, is incorporated herein by reference.

BACKGROUND OF THE INVENTION

The invention relates to clutches in general, particularly to improvements in friction clutches of the type suitable for use in the power trains of motor vehicles, e.g., to transmit torque between the rotary output element of a prime mover (such as the output shaft of a combustion engine, of an electric motor or of a hybrid engine) and the input shaft of a manually shiftable, automated or automatic change-speed transmission. Still more particularly, the invention relates to improvements in clutches wherein the clutch disc (also called clutch plate) comprises at least one rotary input section and an output section which is coaxial with and can be connected or is connected with the input section when one of such sections is to transmit torque to or receive torque from the other section or sections.

In certain clutches, the input and output sections of the clutch disc are permanently connected (e.g., of one piece) with each other. However, it is also known to utilize input and output sections which are separately produced parts. Still further, it is known to construct and assemble the clutches in such a way that the clutch disc does not employ or comprise a torsion damper which serves to transmit torque in the circumferential direction of the clutch disc (e.g., between the rotary output element of an engine and the input element of the transmission in the power train of a motor vehicle. Clutches employing such clutch discs and torsion dampers are disclosed, for example, in published German patent applications Ser. Nos. 2951 573, 4117 582 and 4322 578.

The clutches and/or clutch discs which embody the present invention can be, and preferably are, constructed and assembled in such a way that they can operate without the aforediscussed torsion dampers. In lieu of employing or cooperating with a torsion damper, clutch discs which embody or form part of the present invention are or can be designed to be utilized in friction clutches employing so called composite (multiple-component) flywheels which include one or more rotary oscillation dampers. Such dampers can be installed to eliminate or to reduce to a bearable value rotary oscillations of the type generated by an internal combustion engine, i.e., to enhance the comfort of the passenger(s) in a motor vehicle.

A drawback of presently known proposals to enhance the comfort offered to the passenger(s) by a motor vehicle wherein the clutch in the power train employs a one-piece clutch plate or clutch disc or a rigid or essentially rigid composite clutch disc is that the friction clutch tends to perform a so-called grabbing action under certain operating conditions of the motor vehicle, for example, in response to engagement of the friction clutch. The grabbing action (also known as frictional oscillations) causes the development of oscillations in the power train of the motor vehicle. A grabbing action which develops between the exposed surfaces of friction linings on the clutch disc and the friction surfaces which contact the friction linings (such as the friction surfaces of the pressure plate and the counterpressure plate (flywheel) of a friction clutch) frequently occurs and is particularly undesirable during starting of the motor vehicle.

OBJECTS OF THE INVENTION

An object of the present invention is to provide a novel and improved combination of parts, including the clutch disc or clutch plate, in the power train of a motor vehicle.

Another object of this invention is to provide a novel and improved friction clutch for use in the power train of a motor vehicle.

A further object of the instant invention is to provide a novel and improved combination of parts which renders it possible to eliminate or to greatly diminish frictional oscillations between the engine and the transmission in the power train of a motor vehicle.

An additional object of the invention is to provide a novel and improved method of eliminating or weakening the aforediscussed grabbing actions of friction clutches during all or practically all stages of operation of a motor vehicle.

Still another object of the invention is to provide a novel and improved power train which is designed for use in motor vehicles and to enhance the comfort to the operator of and to the passenger(s) (if any) in a motor vehicle, even under those circumstances when a certain discomfort is unavoidable in motor vehicles employing presently known power trains.

A further object of the present invention is to provide a novel and improved method of improving power trains in motor vehicles of the type wherein the friction disc of the friction clutch does not employ or does not cooperate with a torsion damper of the type disclosed in the afore-enumerated published German patent applications.

Another object of the instant invention is to provide novel and improved torque transmitting connections between the clutch disc and a damper in the power train of a motor vehicle.

An additional object of the invention is to provide a simple, compact and efficient combination of parts which can replace groups of parts in conventional power trains to thus eliminate or at least weaken the undesirable effects of the aforediscussed grabbing action or frictional oscilations even under circumstances when such action is unavoidable in motor vehicles employing conventional power trains.

Still another object of the present invention is to provide a power train which exhibits the above-enumerated features and advantages even though it employs or can employ a simple and inexpensive (such as one-piece) clutch disc or clutch plate.

SUMMARY OF THE INVENTION

One feature of the present invention resides in the provision of a clutch or in a combination which includes a clutch, particularly a friction clutch in the power train of a motor vehicle. The combination comprises a clutch disc which is rotatable about a predetermined axis and includes at least one input section having friction linings as well as an output section coaxial with and in torque-transmitting engagement with the at least one input section. Such combination further comprises a dynamic damper having a mass, and means for transmitting torque between the mass and the clutch disc. The torque transmitting means includes (a) a rotary oscillation damper having energy storing means, and (b) a slip clutch in series with the oscillation damper.

The dynamic damper forms part, or can form part, of the clutch disc. Furthermore, the output section of the clutch disc shares, or can share, at least a majority of rotary movements of the at least one input section about the predetermined axis. The transmission of torque from the clutch disc to the mass of the dynamic damper can take place by way of the slip clutch and thereupon by way of the oscillation damper.

The output section of the clutch disc includes, or can include, a hub and the dynamic damper is or can be mounted on the hub. The at least one input section of the clutch disc can comprise a flange arranged to share rotary movements of the hub about the predetermined axis. The flange is or can be of one piece with the hub and can be arranged to extend at least substantially radially of the predetermined axis. The mounting of the flange can be such that one of its sides is adjacent and that its other side faces away from the dynamic damper.

In accordance with a presently preferred embodiment, the dynamic damper comprises a portion which is in torque-transmitting engagement with the mass, at least by way of the energy storing means. The just mentioned portion of the dynamic damper is, or can be, in torque-transmitting engagement with the at least one input section and/or with the output section of the clutch disc by way of the slip clutch. The energy storing means can comprise one or more coil springs.

The novel combination further comprises, or can further comprise, a pressure plate which is coaxial with the clutch disc and is movable in the direction of the predetermined axis toward and away from frictional engagement with the friction linings of the at least one input section of the clutch disc. Such combination can further comprise a motor-driven flywheel which is coaxial with the clutch disc and is engageable by the friction linings to rotate the clutch disc in response to frictional engagement of the friction linings by the pressure plate. As utilized in the preceding sentence of this specification, the term "motor-driven" is intended to refer to a one-piece or composite flywheel which is arranged to be driven by an electric motor, by an engine (such as the internal combustion engine of a motor vehicle), by a hybrid motor or by any other suitable prime mover.

Another feature of the present invention resides in the provision of a power train which can be utilized with advantage in a motor vehicle, e.g., in a passenger car. The improved power train comprises a prime mover having a rotary output element (such as the output shaft of a combustion engine), a transmission having a rotary input element which is coaxial with the output element, and an engageable and disengageable friction clutch. The latter includes a flywheel which is coaxial with and is arranged to be driven by the output element, and a clutch disc which is coaxial with and is arranged to rotate with the output element of the prime mover in the engaged condition of the friction clutch. The clutch disc includes at least one input section having friction linings which are engaged by and receive torque from the flywheel in the engaged condition of the clutch, and the clutch disc further includes an output section which is coaxial with and in torque transmitting engagement with the at least one input section. The friction clutch further comprises a dynamic damper and means for transmitting torque between a mass of the dynamic damper and the clutch disc. Such torque transmitting means includes a rotary oscillation damper which comprises one or more coil springs or other suitable energy storing means. A slip clutch of the torque transmitting means is in series with the oscillation damper.

The flywheel can be of the type including a first mass arranged to receive torque from the output element of the prime mover, a second mass adjacent the friction linings, and a resilient damper between the first and second masses.

A space-saving layout can be arrived at if the dynamic damper surrounds one of the input and output sections and is adjacent the other of these sections. The friction clutch of such power train can further comprise a pressure plate which surrounds the dynamic damper and urges the friction linings against the flywheel in the engaged condition of the friction clutch.

At least one section of the clutch disc is or can be movable relative to the other section axially and/or radially of the input element of the transmission.

The novel features which are considered as characteristic of the invention are set forth in particular in the appended claims. The improved power train itself, however, both as to its construction and the modes of assembling and operating the same, together with numerous additional important and advantageous features and attributes thereof, will be best understood upon perusal of the following detailed description of certain presently preferred specific embodiments thereof with reference to the accompanying drawings.

DESCRIPTION OF PREFERRED EMBODIMENTS

Figure 1:
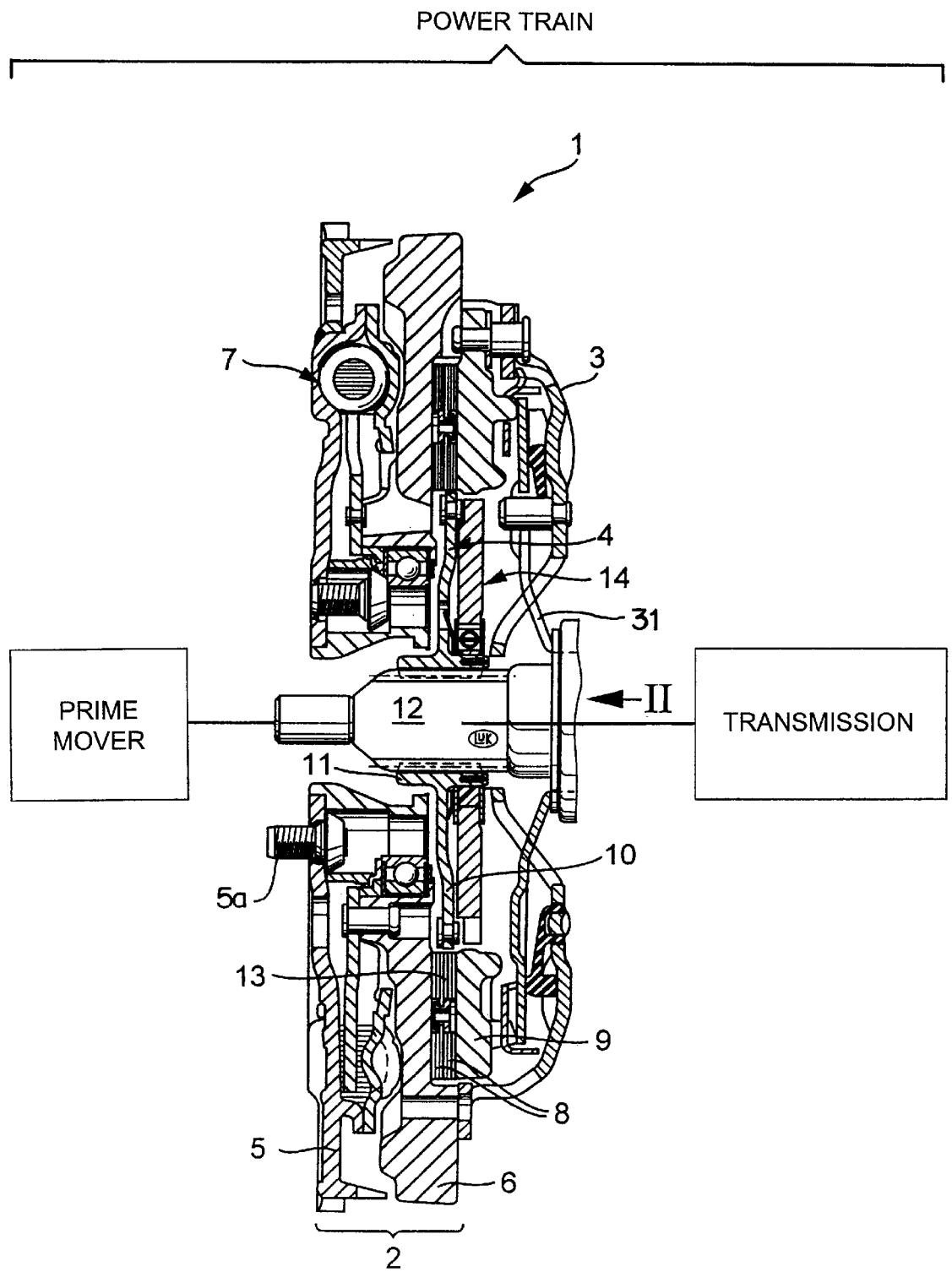
FIG. 1 is an axial sectional view of a power train in a motor vehicle with a prime mover, a change-speed transmission, and an engageable and disengageable friction clutch.
Figure 2:
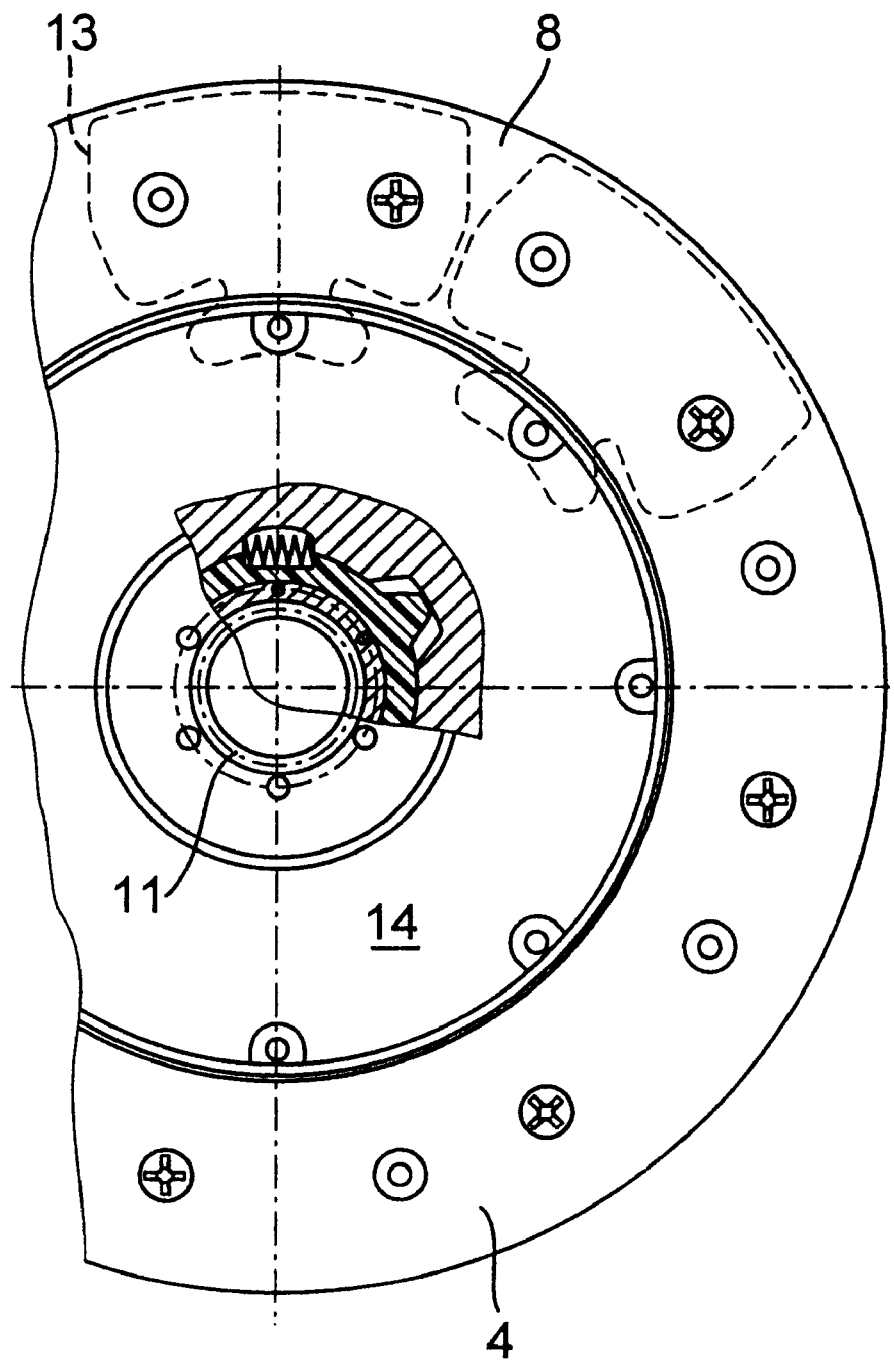
FIG. 2 is a fragmentary elevational view as seen in the direction of arrow II in FIG. 1 and with certain parts (such as the diaphragm spring, the housing and the pressure plate of the friction clutch) omitted.

FIGS. 1 and 2 illustrate certain relevant component parts of a friction clutch 1 which is installed in a power train between the prime mover (such as a combustion engine) and the transmission of a motor vehicle. The friction clutch 1 comprises a composite flywheel 2 including a primary mass 5 normally receiving torque from the engine, a secondary mass 6 which is coaxial with and is turnable relative to the primary mass 5, and a resilient damper 7 which transmits torque between the masses 5 and 6 when the engine drives the mass 5 or when the vehicle is coasting. The means for coupling the primary mass 5 to the output element (such as a shaft) of the engine comprises a ring-shaped array of threaded fasteners 5a (one shown in FIG. 1).

The friction clutch 1 further comprises a housing or cover 3 which shares the angular movements of the secondary mass 6 (the latter is known as counterpressure plate of the clutch), a pressure plate 9 which bears upon the friction linings 8 of the clutch disc 4 when the clutch is engaged, and a diaphragm spring 31 which is fulcrumed at the inner side of the housing 3 and bears upon the pressure plate 9 when the clutch 1 is engaged. At such time, the engine drives the rotary input element 12 of the transmission by way of the primary mass 5, resilient damper 7 and secondary mass (counterpressure plate) 6 of the composite flywheel 2. The friction linings 8 are compressed between the adjacent friction surfaces of the plates 6 and 9 so that the clutch disc 4 transmits torque to the input element 12 of the transmission. The latter can drive the wheels of the motor vehicle (in the desired direction and at the desired or required speed) by way of a differential (not shown) and the axles of the respective wheels. Reference may be had, for example, to the commonly owned U.S. Pat. No. 5,725,456 granted Mar. 10, 1998 to Fischer et al. for "METHOD OF REGULATING THE OPERATION OF A TORQUE TRANSMISSION APPARATUS".

Figure 3:
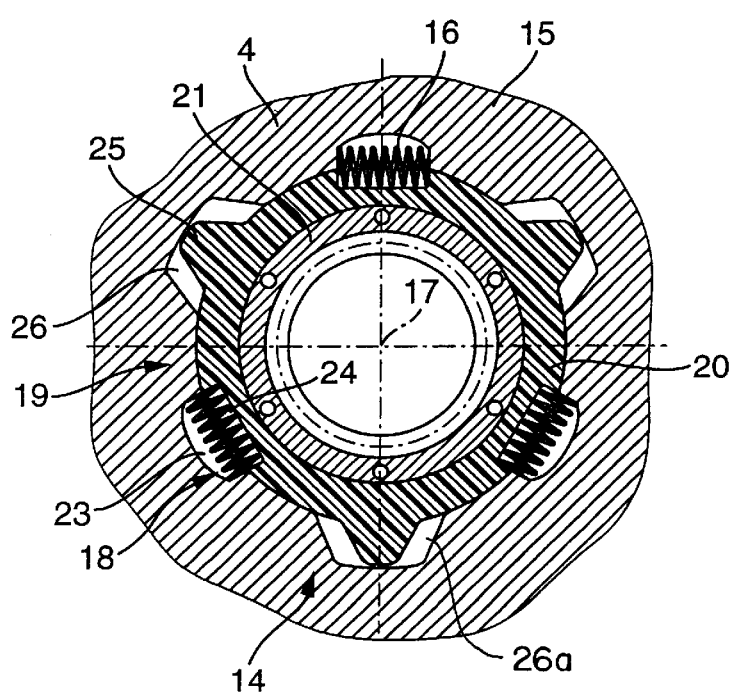
FIG. 3 is an enlarged view of a detail in the central portion of the structure shown in FIG. 1.
Figure 4:
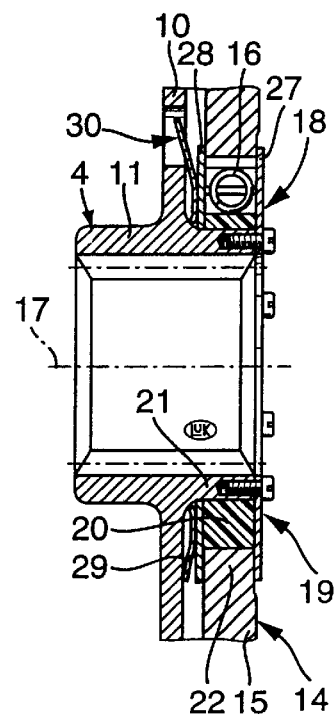
FIG. 4 is an enlarged view of sections of the clutch disc and of certain other constituents of the structure shown in the central portion of FIG. 1, with the input element of the transmission omitted.

As can be best seen in FIGS. 1 and 4, the clutch disc 4 further comprises a radially extending flange-like input section 10 which carries the friction linings 8, and a sleeve-like hub-shaped output section 11 having internal splines in torque-transmitting engagement with complementary external splines of the input element 12 of the transmission. In the clutch 1 of FIGS. 1 to 4, the section 10 is of one piece with the section 11. However, it is equally within the purview of the invention to employ a clutch disk wherein the input and output sections are separately produced parts and/or wherein at least one of these sections (such as the input section 10) is assembled of two or more parts. Reference may be had, for example, to U.S. Pat. No. 2,176,696 (granted Oct. 17, 1949 to Wemp for "HUB CONSTRUCTION FOR CLUTCH MEMBERS OR THE LIKE), U.S. Pat. No. 3,249,995 (granted May 10, 1966 to Smirl for "METHOD OF FABRICATING CLUTCH-DRIVEN PLATE ASSEMBLY"), U.S. Pat. No. 4,416,564 (granted Nov. 22, 1983 to Billet et al. for "HUB AND WEB ASSEMBLY") and U.S. Pat. No. 4,792,030 (granted Dec. 20, 1988 to Huber et al. for "HUB FOR CLUTCH DISCS OF FRICTION CLUTCHES IN MOTOR VEHICLES").

The flange-like input section 10 of the composite clutch disc 4 carries radially outwardly extending plate-like resilient supports 13 (known as segments) for the two sets of friction linings 8. Reference may be had to commonly owned U.S. Pat. No. 5,409,091 granted Apr. 25, 1995 to Reik et al. for "AUTOMATICALLY ADJUSTABLE FRICTION CLUTCH". The segments 13 are resiliently deformable in the axial direction of the friction clutch 1 and serve to permit for a gradual buildup and a gradual reduction of torque being transmitted during progressive engagement or disengagement of the clutch. Reference may be had to the paragraph bridging the columns 8 and 9 of the U.S. Pat. No. 5,409,091 to Reik et al.

The clutch disc 4 does not exhibit any elasticity as seen in the circumferential direction of its sections 10 and 11. Otherwise stated, this clutch disc does not embody or cooperate with a rotary oscillation damping device or portion or member such as would be designed to transmit or to be capable of transmitting at least a portion of the torque being transmitted by the clutch 1. The improved structure does embody a rotary oscillation damper; however, such damper (shown at 18) does not form part of the clutch disc 4.

When the friction clutch in the power train of a motor vehicle is in actual use, the power train is apt to develop torsional vibrations under many circumstances; in many or most instances, such torsional vibrations are attributable to the so-called grabbing phenomenon. This phenomenon develops or arises at the locations where one of the two sets of friction linings 8 engages the friction surface of the secondary flywheel (counterpressure plate) 6 of the composite flywheel 2, and where the other of the two sets of friction linings 8 engages the friction surface of the axially movable pressure plate 9 when the friction clutch 1 is in the process of being engaged, i.e., when the extent of axial movement of the pressure plate 9 under the bias of the diphragm spring 31 is such that the two sets of friction linings 8 contact the respective friction surfaces and begin to compress the segments 13. Friction clutches of such character are known as grabbing clutches.

The term "grabbing" is also employed to designate certain types of brakes. Thus, a brake is called a grabbing brake when it undergoes an abrupt (hard) application in response to a mere slight or light depression of the brake pedal. Reference may be had, for example, to page 1050 of "Modern Automotive Technology" by James E. Duffy (1994 Edition published by the Goodhart-Willcox Company, Inc., Tinley Park, Ill.).

The grabbing action of the friction clutch in the power train of a motor vehicle is attributable, at least to a considerable extent, to fluctuations (non-uniformity) of rotation of the output element of the prime mover (such as the prime mover (e.g., an engine) which drives the primary mass 5 of the composite flywheel 2). Furthermore, the development of grabbing action is or is likely to be attributable (e.g., to a certain extent) to fluctuations of the forces with which the friction linings 8 bear upon the friction surface of the secondary mass (counterpressure plate) 6 and/or upon the friction surface of the pressure plate 9; for example, the just mentioned forces are likely or bound to fluctuate if the friction surface of the plate 6 and/or 9 is not exactly parallel to the adjacent exposed surfaces of the respective sets or groups or arrays of friction linings 8.

Still further, the grabbing action of the friction clutch 3 or an equivalent clutch is likely or bound to develop in response to fluctuations of the so-called friction value, e.g., due to changes of temperature at the aforementioned friction surfaces of the linings 8 adjacent the plate 6 and/or 9 and/or due to changes of velocity of sliding movement of the two sets of friction linings 8 relative to the respective friction surfaces of the plates 6 and 9.

The just mentioned changes of velocity of sliding movement between the friction linings 8 and the respective plates 6, 9 can entail the development of grabbing action in the power train of the motor vehicle. Grabbing of the clutch, in turn, entails the development of periodical changes of the RPM of the output element (e.g., a shaft) of the engine, and such periodical changes of the RPM are a cause of unanticipated and undesirable repeated acceleration and deceleration of the motor vehicle. Repeated undesirable acceleration and deceleration of a motor vehicle are known as jolting, surging or jerking; a common characteristic of such phenomena is that they are highly unpleasant to the occupant (s) of the motor vehicle, especially if they are a cause of continuous or intermittent noise. All in all, grabbing is a phenomenon which, up to the advent of the present invention, could not be adequately controlled by resorting to heretofore known proposals for its elimination or abatement.

In accordance with an important feature of the present invention, the aforementioned elimination or pronounced abatement of grabbing of the clutch 1 to an acceptable or tolerable value is achieved by the provision of (a) a novel so-called dynamic damper (rotary oscillation absorber) 14 which has an inertia mass 15, and (b) means for transmitting torque between the mass 15 and the clutch disc 4. The torque transmitting means includes energy storing means here shown as an annular array of energy storing elements 16, and a slip clutch 19 which is in series with the aforementioned damper 18. The illustrated energy storing elements 16 are coil springs which bear upon the dynamic damper 14 and react against the mass 15. The energy storing elements 16 (hereinafter called springs or coil springs) are equidistant from the axis 17 of the clutch disc 4. FIG. 3 shows that the damper 18 comprises three springs 16 which are equidistant from each other (as seen in the circumferential direction of the clutch disc).

The coil springs 16 form part of the aforementioned oscillation damper 18 which is connected in series with a torque limiting means constituted by the slip clutch 19. The latter is connected in series with and is installed upstream of the damper 18.

The slip clutch 19 of the friction clutch 1 which is shown in FIGS. 1 to 4 comprises an annular portion 20 which surrounds a cylindrical section 21 of the hub 11. The section 21 serves as a means for centering the annular portion 20. It is presently preferred to select the dimensions of the annular portion 20 in such a way that (as seen in the direction of the axis 17) this portion constitutes a band having an axial length at least slightly exceeding that of the adjacent portion 22 of the mass 15 of the dynamic damper 14.

As can be seen in FIGS. 3 and 4, the mass 15 surrounds the annular portion 20 and is directly centered thereby. FIG. 3 further shows that the cylindrical external surface of the annular portion 20 is provided with recesses or sockets 24 confronting recesses or sockets 23 provided in the cylindrical internal surface of the mass 15 of the dynamic damper 14. Each spring 16 has a radially outer portion received in one of the recesses 23 and a radially inner portion received in the respective recess 24. Such mounting of the springs 16 ensures that they yieldably oppose angular movements of the mass 15 of the dynamic damper 14 and the adjacent portion 20 of the damper 14 relative to each other. As can be best seen in FIG. 4 (and as already described hereinbefore), the damper 14 includes the parts 15, 20 and such parts can turn relative to each other during expansion or contraction of the coil springs 16.

The annular intermediate portion 20 is provided with external abutments or stops 25 each of which constitutes an axially extending rib or an equivalent thereof. The stops 25 cooperate with complementary stops 26a which are portions of surfaces bounding recesses 26 in the internal surface of the mass 15. The stops 25, 26a cooperate with each other to determine the extent of angular movability of the parts 15 and 20 relative to each other.

It is to be understood that the just described parts 25, 26a constitute but one of several means for determining the extent of angular movability of the parts 20 and 15 with reference to each other. For example, the extent of such movability can be determined by the coil springs 16 or by equivalent springs. The upper limit of the extent of angular movability of the parts 20 and 15 relative to each other can be reached when the neighboring convolutions of each of the coil springs 16 respectively abut each other, i.e., when the thus fully compressed coil springs 16 act as solid blocks without any play between their respective convolutions. Such modification constitutes a simplification which reduces the overall cost of the friction clutch because it can dispense with precision treatment and dimensioning of the coil springs 16, surfaces (stops) 26a surrounding the recesses 26 and surfaces surrounding the stops 25.

The slip clutch 19 is provided with two flat washer-like members 27, 28 which overlie and extend radially beyond the internal surface of the radially innermost portion 22 of the mass 15 of dynamic damper 14. The extent of radial overlap between the radially extending radially innermost portions of the members 27, 28 and the adjacent radial surfaces of the portion 22 of the mass 15, as well as the force with which the members 27, 28 bear upon the adjacent surfaces of the portion 22, determine the slip torque of the clutch 19. In the embodiment which is shown in FIGS. 1 to 4, the disc-shaped portion 27 is non-rotatably affixed to the hub 11; on the other hand, the disc-shaped portion 28 is movable axially relative to the portion 21. This ensures that the axial confinement of the annular portion 20 of the slip clutch 19 between the members 27, 28 can remain in a required (optimum) condition.

An energy storing device 29 is installed at that side of the disc-shaped portion 28 which faces away from the annular portion 20; this energy storing device is clamped (i.e., installed in prestressed condition) between the disc-shaped portion 28 and the radially inner portions of the input section 10 to thus determine the magnitude of the torque being transmitted by the slip clutch 19. In the embodiment which is depicted in FIGS. 1 to 4, the energy storing device 29 (this device constitutes or acts as a diaphragm spring) is non-rotatably affixed to the input section 10 by a form-locking connection 30. It is also possible, and often advisable, to establish a form-locking (i.e., rotation-preventing) connection at least between the disc-shaped portion 28 and the clutch disc 4.

It has been ascertained that the establishment of an oscillation damper 18 whose damping action is parallel to that of the coil springs 16 constitutes a desirable and advantageous feature of the improved power train. This can be achieved in any one of several ways, for example, by establishing a frictional engagement between the mass 15 of the dynamic damper 14 and at least one of the disc-shaped portions 27, 28 or by the establishment of an axially effective connection between the mass 15 and at least one of these disc-shaped portions. By way of example, the radially outermost regions of the disc-shaped portions 27, 28 can be configurated in such a way that they clamp the radially inner portions of the mass 15 axially with a preselected force. Alternatively, at least one of the portions 27, 28 can be coupled to the mass 15 by a diaphragm spring, by a corrugated spring and/or by an analogous part which acts in the direction of the axis 17. Still further, at least one of the portions 27, 28 can be operatively connected with the mass 15 by one or more friction linings (not shown) which is or which are designed and/or installed and/or dimensioned in such a way that it or they establish a predetermined frictional engagement of the portions 27, 28 with the mass 15.

An important advantage of the establishment of a series connection between the slip clutch 19 and the rotary oscillation damper 18 is that one can reliably and predictably prevent excessive stressing of those parts which participate in the transmission of torque between the hub 11 and/or the disc-shaped or flange-like section 10 on the one hand and the mass 15 on the other hand, even when the RPM of the composite flywheel 2 or of its secondary mass 6 fluctuates within a wide range, i.e., when such fluctuations of the RPM entail pronounced increases of angular velocity.

If the magnitude of the torque which develops (as a result of the generation of pronounced acceleration forces) between the hub 11 and the mass 15 reaches or exceeds a predetermined value, the rotary oscillation damper 18 becomes ineffective so that it no longer compels the mass 15 to rotate in unison with the annular portion 20 of the slip clutch 19. This feature ensures that one can avoid the development of pronounced (excessive) impacts in the region where at least one of the parts 15 and 20 is to be held against rotation relative to the other of such parts.

It is desirable to tune the dynamic damper 14 for operation at a first characteristic frequency of the power train at transmission side while the clutch 1 is disengaged. In many instances, such characteristic frequency is within the range of between about 8 and 14 Hz. If the improved power train is installed in a medium-sized passenger car, the aforediscussed characteristic frequency is or can be within the range of between about 10 and 11 Hz.

If the improved power train is to be put to use in passenger cars, the dynamic damper 14 preferably comprises or cooperates with a rotary oscillation damper 18 having one or more energy storing devices (such as the aforediscussed coil springs 16) arranged to generate a torsion resistance within the range of between about 0.05 and 0.4 Nm/°, most preferably within the range of between about 0.05 and 0.25 Nm/°. In many instances, the optimum torsion resistance is or at least approximates 0.2 Nm/°.

The oscillation damper 18 which is shown in the drawing is a single-stage damper. However, it is also possible to employ a multiple-stage damper, e.g., in a manner known in connection with clutch discs which are equipped with first-stage or idle-stage dampers (such as internal or external first stage dampers).

It is also within the ambit of the present invention to associate the rotary oscillation damper 18 with a so-called friction control plate or with a friction control device (friction facing) having a certain torsional play. The utilization of such expedients renders it possible to establish a frictional hysteresis which is effective in parallel to the action of the energy storing elements 16. In the event that one selects a friction control device having a certain torsional play, and if one reverses the direction of relative rotation between the mass 15 of the dynamic damper 14 and the hub 11, the friction by way of the torsional play is not effective.

The basic friction which is effective in parallel with the energy storing elements (coil springs) 16 is or can be in the range of between about 0.05 and 0.3 Nm, preferably in the range of between about 0.05 and 0.2 Nm. In most instances, especially if one resorts to the aforedescribed novel clutch discs in the power trains of passenger cars, it is of advantage if the torque limiting clutch (such as the slip clutch) 19 furnishes a slip torque within the range of between 1 and 8 Nm, preferably within the range of between 2 and 4 Nm. It has been found to be particularly advantageous if the average slip torque is or approximates 4 Nm; it is advisable to rely upon a certain tolerance with a band width of approximately ±2 Nm in order to take into consideration the existing operating conditions (such as fluctuations of the temperature, humidity and/or others) which are likely to cause fluctuations of the friction coefficient.

The above-enumerated parameters can be combined with an inertia mass (15) which exhibits a coefficient of friction in the range of between about 0.001 and 0.004 kgm$^2$, preferably within the range of between about 0.002 and 0.003 kgm$^2$.

Starting from an initial angular position, the extent of angular displacement which is made possible by the rotary oscillation damper 18 is within the range of between ±3° and ±15° (preferably within the range of between about ±6° and ±10°. The just mentioned range can be widened or narrowed in dependency upon the intended use of the novel friction clutch. It is also possible that, proceeding from a starting position of the mass 15 relative to the output section 11 of the clutch disc 4, one selects the angular displacement of the oscillation damper 18 in one direction in a manner different from angular displacement in the opposite direction. In other words, one can resort to an asymmetrical characteristic damping curve for the damper 18.

The improved dynamic damper 14 (or an equivalent thereof) can be utilized with equal or similar advantage in conjunction with continuously variable (CVT) transmissions, especially to serve as a starter clutch. Reference may be had, for example, to commonly owned U.S. Pat. No. 5,217,412 granted Jun. 8, 1993 to Indlekofer et al. for "CONTINUOUSLY VARIABLE SPEED TRANSMISSION".

To summarize: An important advantage of the improved friction clutch is that the mass 15 of the dynamic damper 14 is rotatable or turnable about the axis 17 of the clutch disc 4 and that the means for transmitting torque between the mass 15 and the clutch disc includes the rotary oscillation damper 18 having energy storing means 16 and a slip clutch (such as 19) in series with the oscillation damper. As already mentioned hereinbefore, it is often desirable to install the slip clutch 19 in such a way that (as seen in the direction of power flow toward the mass 15) the slip clutch is located upstream of the damper 18. However, and as also mentioned hereinbefore, there are circumstances when it is desirable and advantageous to install the slip clutch 19 (or an equivalent thereof) downstream of the damper 18.

A presently preferred damper 18 employs at least one hysteresis or damper arrangement which is connected in parallel with the coil springs 16; these coil springs constitute the presently preferred energy storing means of the damper 18.

Though the (at least one) input section 10 of the illustrated clutch disc 4 is of one piece with the output section 11, it is often desirable to assemble the clutch disc of several discrete sections (e.g., of several input sections and a single output section). It is also possible to assemble the clutch disc 4 in such a way that at least one of two or more input sections (10) is movable at least radially relative to at least one output section (11). In order to facilitate the assembly or proper assembly of such clutch disc, it is advisable or even necessary to employ means for permitting or facilitating at least some (e.g., slight or minute) angular movements of the sections 10, 11 relative to each other. Clutch discs of such character are disclosed, for example, in published German patent applications Ser. Nos. 1990 1043 and 4424 186 as well as in the previously mentioned published German patent application Ser. No. 4322 578.

An advantage of the feature that the output section 11 of the clutch disc 4 constitutes or resembles a hub is that it can carry the dynamic damper 14, i.e., and as shown in FIGS. 1 and 4, that at least a portion of the hub 11 is surrounded by the damper 14. The latter is adjacent one side of the radially extending flange-like section 10 of the clutch disc 4; the other side of the section or flange 10 faces away from the dynamic damper 14, i.e., it faces toward the composite flywheel 2 and the engine of the motor vehicle.

An advantage of the annular portion 20 of the dynamic damper 14 is that it is free to perform limited angular movements relative to the mass 15 (due to the provision of the coil springs 16) as well as that it is coupled to the input and/or output section(s) 10, 11 of the clutch disk 4 by the friction clutch 19.

The improved friction clutch 1 and/or its dynamic damper 14 is susceptible of numerous additional modifications without departing from the spirit of the present invention. For example, the illustrated dynamic damper 14 can be combined with or incorporated in clutch discs which are provided with so-called idling dampers acting in parallel or in series with at least one main (primary) or load damper. Dynamic dampers which cooperate with such clutch discs can be mounted on the input section(s) 10 of the clutch disc (i.e., on the section(s) carrying the friction linings 8), on the output section(s) 11, or on the annular portion 20 of the slip clutch 19. Clutch discs of the just outlined character are disclosed, for example, in published German patent applications Ser. Nos. 1992 0397 and 4304 778.

An advantage of the aforementioned asymmetrical characteristic damping curve for the damper 18 is that this renders it possible to conform the damping characteristics of the dynamic damper 14 to the oscillation characteristics of the power train in which the improved friction clutch 1 is put to use. For example, and as already mentioned hereinbefore, the torque limiting (slip) clutch 19 can furnish a slip torque within the range of between 1 and 8 Nm, preferably within the range of between 2 and 4 Nm, while the clutch disc 4 rotates in a first direction. This range can have rather pronounced torque peaks which exceed torque peaks developing during rotation in a second (opposite) direction or vice versa. The asymmetrical characteristic damping curve renders it possible to more reliably or more accurately account for differences between torque peaks which develop during rotation of the clutch disc 4 in the first and second directions.

The intermediate portion 20 of the slip clutch 19 can be made of a rigid or substantially rigid material, e.g., a synthetic plastic substance.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of making friction clutches and clutch discs for use in friction clutches and, therefore, such adaptations should and are intended to be comprehended within the meaning and range of equivalence of the appended claims.

What is claimed is:

1. In a clutch, a combination comprising
a clutch disc rotatable about a predetermined axis and including at least one input section having friction linings and an output section coaxial with and in torque-transmitting engagement with said at least one input section;
a dynamic damper having a mass; and
means for transmitting torque between said mass and said clutch disc, including a rotary oscillation damper having energy storing means and a slip clutch in series with said oscillation damper, wherein said energy storing means elastically couples the mass to the clutch disc, thereby enabling the mass to perform rotary oscillations relative to the clutch disc.

2. The combination of claim 1, wherein the clutch is a friction clutch in a power train of a motor vehicle.

3. The combination of claim 1, wherein said dynamic damper forms part of said clutch disc.

4. The combination of claim 1, wherein said output section of said clutch disc shares at least a majority of rotary movements of said at least one input section about said axis.

5. The combination of claim 1, wherein the transmission of torque from said clutch disc to said mass takes place by way of said slip clutch and thereupon by way of said oscillation damper.

6. The combination of claim 1, wherein said energy storing means comprises at least one coil spring.

7. The combination of claim 1, wherein said dynamic damper comprises a portion which is in torque-transmitting engagement with said mass at least by way of said energy storing means.

8. The combination of claim 7, wherein said portion of said dynamic damper is in torque-transmitting engagement with at least one of said input and output sections of said clutch disc by way of said slip clutch.

9. The combination of claim 1, further comprising a pressure plate coaxial with said clutch disc and movable in the direction of said axis toward and away from frictional engagement with the friction linings of said at least one input section of said clutch disc.

10. The combination of claim 9, further comprising a motor-driven flywheel coaxial with said clutch disc and engageable by said friction linings to rotate said clutch disc in response to frictional engagement of said friction linings by said pressure plate.

11. The combination of claim 1, wherein said output section of said clutch disc includes a hub.

12. The combination of claim 11, wherein said dynamic damper is mounted on said hub.

13. The combination of claim 11, wherein said at least one input section of said clutch disc comprises a flange arranged to share rotary movements of said hub about said axis.

14. The combination of claim 13, wherein said flange is of one piece with said hub.

15. The combination of claim 13, wherein said flange extends substantially radially of said axis.

16. The combination of claim 13, wherein said flange has a first side adjacent said dynamic damper and a second side facing away from said dynamic damper.

17. a power train for use in a motor vehicle, comprising:
a prime mover having a rotary output element;
a transmission having a rotary input element coaxial with said output element; and
an engageable and disengageable friction clutch including:
a flywheel coaxial with and arranged to be driven by said output element,
a clutch disc coaxial with and arranged to rotate with said output element in the engaged condition of said clutch, said clutch disc including at least one input section having friction linings engaged by and receiving torque from said flywheel in the engaged condition of the clutch and said clutch disc further including an output section coaxial with and in torque transmitting engagement with said at least one input section,
a dynamic damper having a mass, and
means for transmitting torque between said mass and said clutch disc, said torque transmitting means including a rotary oscillation damper having energy storing means and said torque transmitting means further including a slip clutch in series with said oscillation damper, wherein said energy storing means elastically couples the mass to the clutch disc, thereby enabling the mass to perform rotary oscillations relative to the clutch disc.

18. The power train of claim 17, wherein said flywheel includes a first mass arranged to receive torque from the output element of the prime mover, a second mass adjacent said friction linings, and a resilient damper between said first and second masses.

19. The power train of claim 17, wherein said dynamic damper surrounds one of said input and output sections and is adjacent to the other of said sections, said friction clutch further comprising a pressure plate surrounding said dynamic damper.

20. The power train of claim 17, wherein at least one of said sections is movable relative to the other of said sections in at least one of the directions including axially and radially of the input element of said transmission.

* * * * *

UNITED STATES PATENT AND TRADEMARK OFFICE
CERTIFICATE OF CORRECTION

PATENT NO.   : 6,601,682 B2
DATED        : August 5, 2003
INVENTOR(S)  : Steffen Lehmann et al.

It is certified that error appears in the above-identified patent and that said Letters Patent is hereby corrected as shown below:

<u>Title page,</u>
Item [75], Inventor, delete "Stefan Lehmann" and substitute with
-- Steffen Lehmann --.

Signed and Sealed this

Thirtieth Day of December, 2003

JAMES E. ROGAN
*Director of the United States Patent and Trademark Office*